United States Patent [19]

Robinson et al.

[11] Patent Number: 5,727,740
[45] Date of Patent: Mar. 17, 1998

[54] METHOD AND APPARATUS FOR RECOVERING FRACTIONAL COMPONENTS OF SOIL

[76] Inventors: Forrest L. Robinson, 12913 Woodson St., Overland Park, Kans. 66209; Willis R. Campbell, 14129 Locust St., Olathe, Kans. 66062

[21] Appl. No.: 675,355

[22] Filed: Jul. 3, 1996

[51] Int. Cl.⁶ .................. B02C 23/18; B02C 23/08
[52] U.S. Cl. .................. 241/20; 241/5; 241/24.14; 241/24.15; 241/24.31
[58] Field of Search .................. 241/24.13, 24.14, 241/24.15, 24.31, 5, 19, 20, 21

[56] References Cited

U.S. PATENT DOCUMENTS

| | | | |
|---|---|---|---|
| 3,062,458 | 11/1962 | Dearing | 241/19 |
| 3,086,718 | 4/1963 | Lukas, Jr. | 241/24.14 |
| 3,672,579 | 6/1972 | Lawver | 241/24.14 |
| 3,791,595 | 2/1974 | Aubrey, Jr. | 241/20 |
| 4,498,633 | 2/1985 | Williams | 241/48 |
| 4,537,599 | 8/1985 | Greenwald, Sr. | 241/20 X |
| 4,585,547 | 4/1986 | Nicholson | 241/21 X |
| 4,598,873 | 7/1986 | Cleemann | 241/21 |
| 4,702,421 | 10/1987 | Wruck et al. | 241/21 X |
| 5,158,238 | 10/1992 | Lehman | 241/24.15 X |
| 5,236,132 | 8/1993 | Rowley, Jr. | 241/5 |
| 5,542,614 | 8/1996 | Toor | 241/21 |

Primary Examiner—Andrea L. Pitts
Assistant Examiner—Julie A. Krolikowski
Attorney, Agent, or Firm—Larry W. Miller

[57] ABSTRACT

A method of removing fractional components from earthen material, including processes for removing precious carbon jewels from soil, precious metals from low grade ores, lead pellets from contaminated soil, and free sulphur from coal, is initiated with a pulverizing of the earthen material bearing the fractional component to be removed therefrom. Subsequent process steps vary, but include the washing of the pulverized material and then removing the fractional component through electromagnetic extraction, chemical dissolution and sieving. Since no contaminate is added to the residue remaining after removal of the fractional component, the residue can be returned to the ground from which the original material was obtained without effecting any additional pollution to the ground or water.

20 Claims, 7 Drawing Sheets

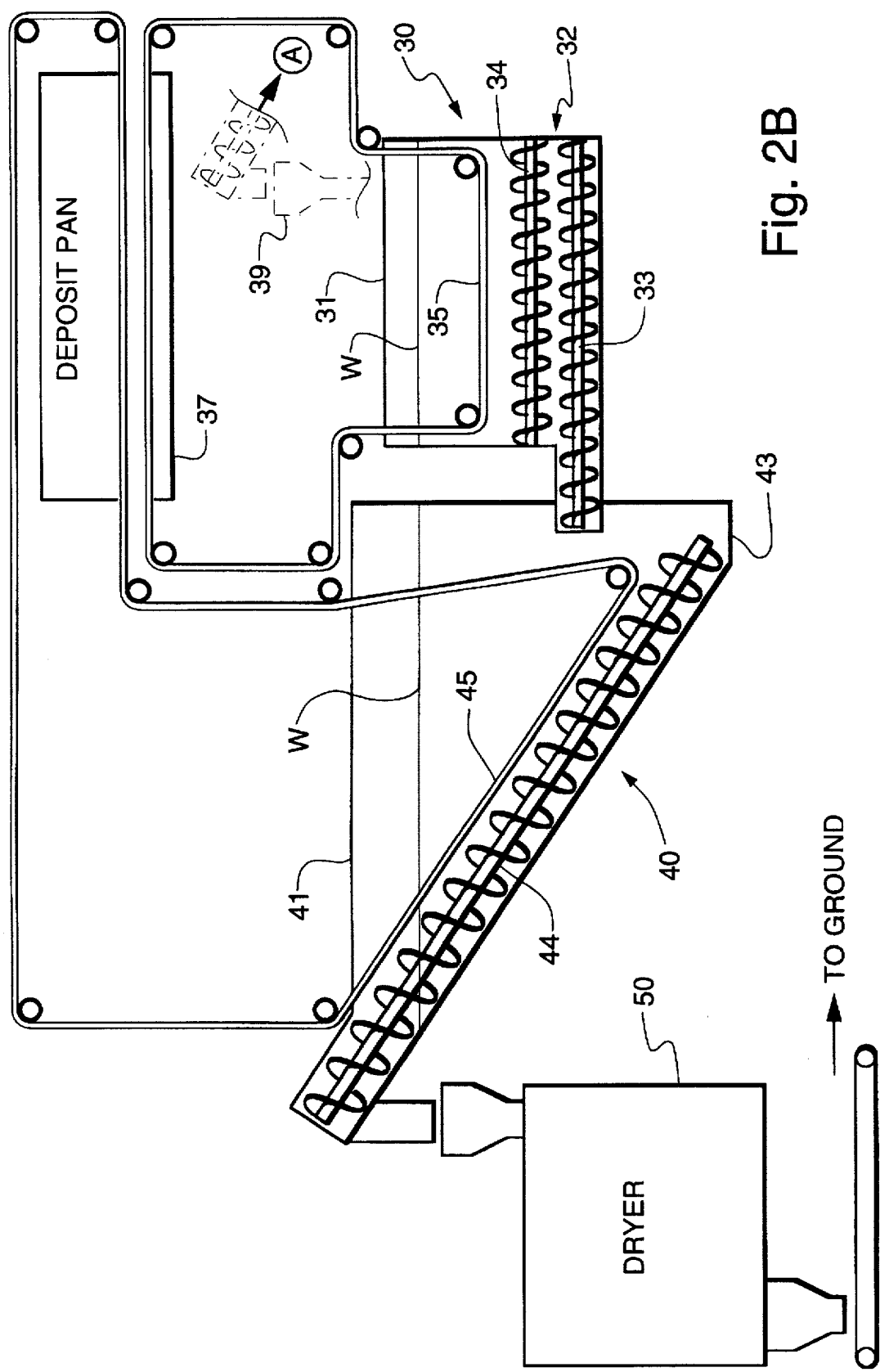

METHOD AND APPARATUS FOR RECOVERING FRACTIONAL COMPONENTS OF SOIL

BACKGROUND OF THE INVENTION

This invention relates generally to the comminution of solid material, such as soil or an ore-like waste material, containing a component therein to be recovered from the comminuted material by a recovery process following the comminution of the material.

Known processes for removing specific materials borne in earth or metal ores have historically either ruined a substantial portion of specific material to be recovered or was financially too expensive to be cost effective. For example, the extraction of gold and platinum from low grade ore-bearing soils have utilized a chemical process that washes the chemical, such as aqua regia, through the ore-bearing soils to dissolve the precious metals from the soil. In most cases, the ore-bearing soil is mechanically ground, such as is accomplished through a hammermill, into a powdered form before the chemicals are washed through the soil. The mechanical grinding is known to destroy up to 25% of the precious metal that is to be recovered, while the amount of chemical required to be washed through the powdered soil to dissolve the remaining precious metal places the expense of the process at such a high level that the truly low grade ores do not produce sufficient quantities of precious metals to justify the cost of the extraction process.

In the case of hydrocarbon contamination of soil, the coating of the soil by a hydrocarbon membrane creates a difficult bond to be pulverized by conventional grinding methods. An improved process, which includes a step for dehydrating the hydrocarbon contaminated soil while pulverizing the soil within a cyclonic comminuting/dehydrating machine, to permit the extraction of the hydrocarbon contaminant through a washing procedure is disclosed in a co-pending patent application entitled "Soil Washing Apparatus and Method", filed with the U.S. Patent and Trademark Office on Mar. 15, 1995, and given U.S. Ser. No. 08/412,897, the description portion thereof being incorporated herein by reference.

Comminuting the material through a cyclonic comminuting/dehydrating machine, such as shown in U.S. Pat. No. 3,794,251, issued on Feb. 26, 1974, for a "Material Reducing System and Apparatus", is well known in the art and facilitates the extraction process. A cyclonic comminuting/dehydrating machine similar to that disclosed in U.S. Pat. No. 5,236,132, has been found to provide satisfactory results. The descriptive portions of the aforementioned U.S. Pat. No. 3,794,251 and U.S. Pat. No. 5,236,132 are incorporated herein by reference, particularly with respect to the manner and mechanism through which a cyclonic comminuting/dehydrating machine operates.

The recovery process disclosed herein can be used for a number of different applications, including the recovery of precious stones, such as diamonds and other carbon jewels like emeralds and tourmaliginite; the recovery of gold, platinum and other precious metals from low grade, ore bearing soils; the recovery of heavy metals, such as lead and mercury, from contaminated soils; the removal of free sulfur from coal; and other similar fractional component recoveries as will be obvious to one of ordinary skill in the art upon a reading of this description of the invention.

SUMMARY OF THE INVENTION

It is an object of this invention to overcome the disadvantages of the prior art by providing a process for recovering a fractional component of earthen material following a comminution of the material.

It is another object of this invention to provide a process for recovering precious stones, such as diamonds and other carbon jewels like emeralds and tourmaliginite, from earth bearing such precious stones.

It is a feature of this invention that a comminuting mechanism is utilized to disintegrate the earthen material without disintegrating the precious carbon jewels therein.

It is an advantage of this invention that the comminuting mechanism is operable to disintegrate the less dense earthen material without damaging the more dense precious carbon jewels.

It is still another object of this invention to provide a process to recover gold, platinum and other precious metals from low grade ore bearing such precious metals in insufficient quantities to justify conventional mining and separating processes.

It is another feature of this invention that the fractional component of the low grade ore bearing the precious metals is comminuted to pulverize the ore before subjecting the pulverized ore to a wash tank and an electromagnetic extractor.

It is another advantage of this invention that the precious metals are carried in an iron ore compound.

It is still another advantage of this invention that the extracted pulverized iron ore compound has a greater concentration of precious metals than the original low grade ore.

It is yet another advantage of this invention that the extracted pulverized iron ore can be economically treated with chemicals to extract the precious metals.

It is still another feature of this invention that the residue remaining after the extraction of iron ore bearing precious metals can be returned to the ground.

It is still another object of this invention to provide a process for the removal of lead pellets from contaminated soils.

It is yet another feature of this invention to subject the contaminated soil to a cyclonic comminutor to reduce the soil to particles, without comminuting the lead pellets.

It is yet another advantage of this invention that the comminuted soil particles will pass through a 200 mesh sieve while the lead pellets cannot.

It is yet another feature of this invention that the residual soil can be further treated with an ion exchange chemical to encapsulate oxidized lead therein.

It is yet another object of this invention to provide a process for the removal of free sulfur from coal.

It is yet another feature of this invention that coal bearing free sulphur is comminuted prior to undergoing a special process for dissolving the free sulphur from the washed residue.

It is a further advantage of this invention that the pulverized coal can be pelletized before being shipped for burning.

These and other objects, features and advantages are accomplished according to the instant invention by providing a method of removing fractional components from earthen material. Processes for removing precious carbon jewels from soil, precious metals from low grade ores, lead pellets from contaminated soil, and free sulphur from coal, are initiated with a pulverizing of the earthen material bearing the fractional component to be removed therefrom. Subsequent process steps vary, but include the washing of the pulverized material and then removing the fractional component through electromagnetic extraction, chemical dissolution and sieving. Since no contaminate is added to the residue remaining after removal of the fractional component, the residue can be returned to the ground from which the original material was obtained without effecting any additional pollution to the ground or water.

BRIEF DESCRIPTION OF THE DRAWINGS

The advantages of this invention will be apparent upon consideration of the following detailed disclosure of the invention, especially when taken in conjunction with the accompanying drawings wherein:

FIG. 2A and FIG. 2B are to be combined to depict a schematic view of the apparatus for reclaiming precious metals from low grade precious metal bearing waste material;

DESCRIPTION OF THE INVENTIONS

Figure 1:
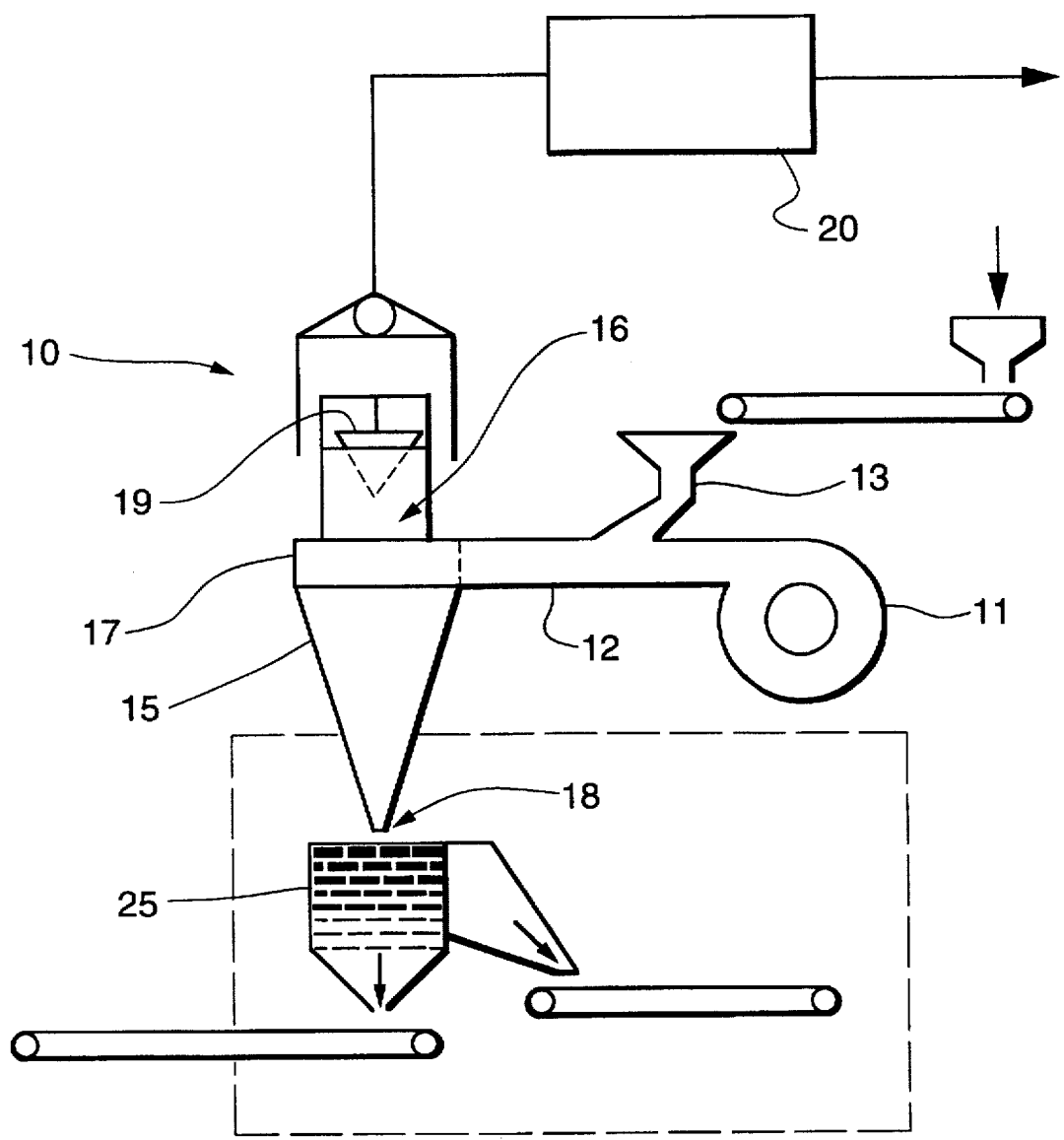
FIG. 1 is a schematic view of apparatus for accomplishing the recovery process for precious stones as described herein.

Referring first to FIG. 1, the apparatus for recovering fractional components of material can best be seen. The cyclonic comminuting/dehydrating machine 10 operates to create a high velocity stream of air from a blower 11 that is directed through a conduit 12 into an inverted conical housing 15. The stream of air is directed into a tornado-like swirling motion within the housing 15 before being discharged out the exit opening 16 at the top center portion of the housing 15. A damper 19 controls the flow of air through the air exit opening 16 and the depth of the swirling motion of the air within the housing 15. A pollution control mechanism 20 captures the discharged stream of air from the air exit opening 16 and operates to precipitate any dust or other pollutants entrained within the air flow. A material infeed hopper 13 meters the flow of material into the air stream in the conduit 12 so that the material to be comminuted enters the housing 15 with the stream of air from the conduit 12.

The housing 15 includes a cylindrical portion 17 that receives the air stream from the conduit 12 to direct the air stream into the swirling motion. The cylindrical portion 17 is lined with hardened steel rasp bars (not shown) that, coupled with the differential forces associated with the tornado-like swirling motion of the air stream within the housing 15, serve to comminute material fed therein through implosion, impaction and centrifugal force, on the basis of quantity and density of the material fed therein.

For example, if a bucket of limestone rocks were fed into the housing 15 through the infeed hopper 13, the rocks would be pulverized into small pieces that would drop by gravity through the material discharge opening 18 formed by truncating the end of the inverted conical housing 15. Similarly, a bucketful of steel bolts fed into the housing 15 would also be pulverized into small pieces. If, however, a handful of steel bolts were fed into the air stream with a bucket of limestone rocks, the rocks would still be pulverized, but the steel bolts would be discharged through the material discharge opening 18 substantially unharmed.

The operation of the rasp bars lining the cylindrical portion 17 of the housing 15 serve both to shred and to ricochet solid material particles within the housing 15, which impacts other solid material particles and, coupled with differential velocities of the swirling air within the housing 15, serves to comminute the lesser dense material within the housing 15. Accordingly, with respect to the examples of the limestone rocks and steel bolts given above, the less dense and higher quantity limestone rocks become comminuted into small pieces, while the steel bolts become discharged relatively unharmed.

The apparatus for recovering precious stones, such as carbon jewels, including diamonds, emeralds and tourmaliginite, can best be seen in FIG. 1. The cyclonic comminuting/dehydrating machine 10 receives soil containing the carbon jewels, which is typically a clay mixture soil, through the infeed hopper 13 to be fed into the housing 15, the position of the damper 19 being adjusted appropriately to provide the desired comminution properties within the housing 15. Since the carbon jewels within the soil is of the lesser quantity and higher density, the clay soil is comminuted into a fine powder, while the carbon jewels are discharged unharmed. At the material discharge opening 18 of the housing 15, the discharged material is passed through a screening mechanism 25 containing a series of progressively finer screens until the discharged material is passed through a 200 mesh screen.

The cyclonic comminuting/dehydrating machine 10 can pulverize and dehydrate the clay soil such that a substantial portion of the soil particles will pass through the 200 mesh screen; however, the unharmed carbon jewels will not pass through the 200 mesh screen and will be discharged off the screening mechanism 25. For security reasons, the screening mechanism 25 will be kept enclosed and limited to only a very restricted access. The carbon jewels will then be conveyed to a high security area where they can be recovered from the discharge of material from the screening mechanism 25. Such security precautions are necessary to minimize opportunities for theft.

The residue passing through the screening mechanism 25 can be returned directly to the ground without further treatment. Since the comminuting process adds nothing to the soil that wasn't originally there before being fed into the infeed hopper 13, there is not any need to further treat the residue. Meanwhile, the stream of air discharged through the exit opening 16 will have dust particles suspended therein and must be run through a precipitator, such as a water mist device, an electrostatic precipitator and/or possibly a mechanical filter, before being released into the atmosphere.

Alternative mechanism for extracting the precious stones from the comminuted material would be to use air jets to blow away the pulverized material, leaving the carbon jewels behind, or by making a mud slurry out of the comminuted material by adding water to the comminuted material, which would leave the precious stones deposited at the bottom of the mud slurry. Neither of these methods are preferred, as the screening methods are the least harmful to the environment, and have the greatest chances of success.

Figure 2A:
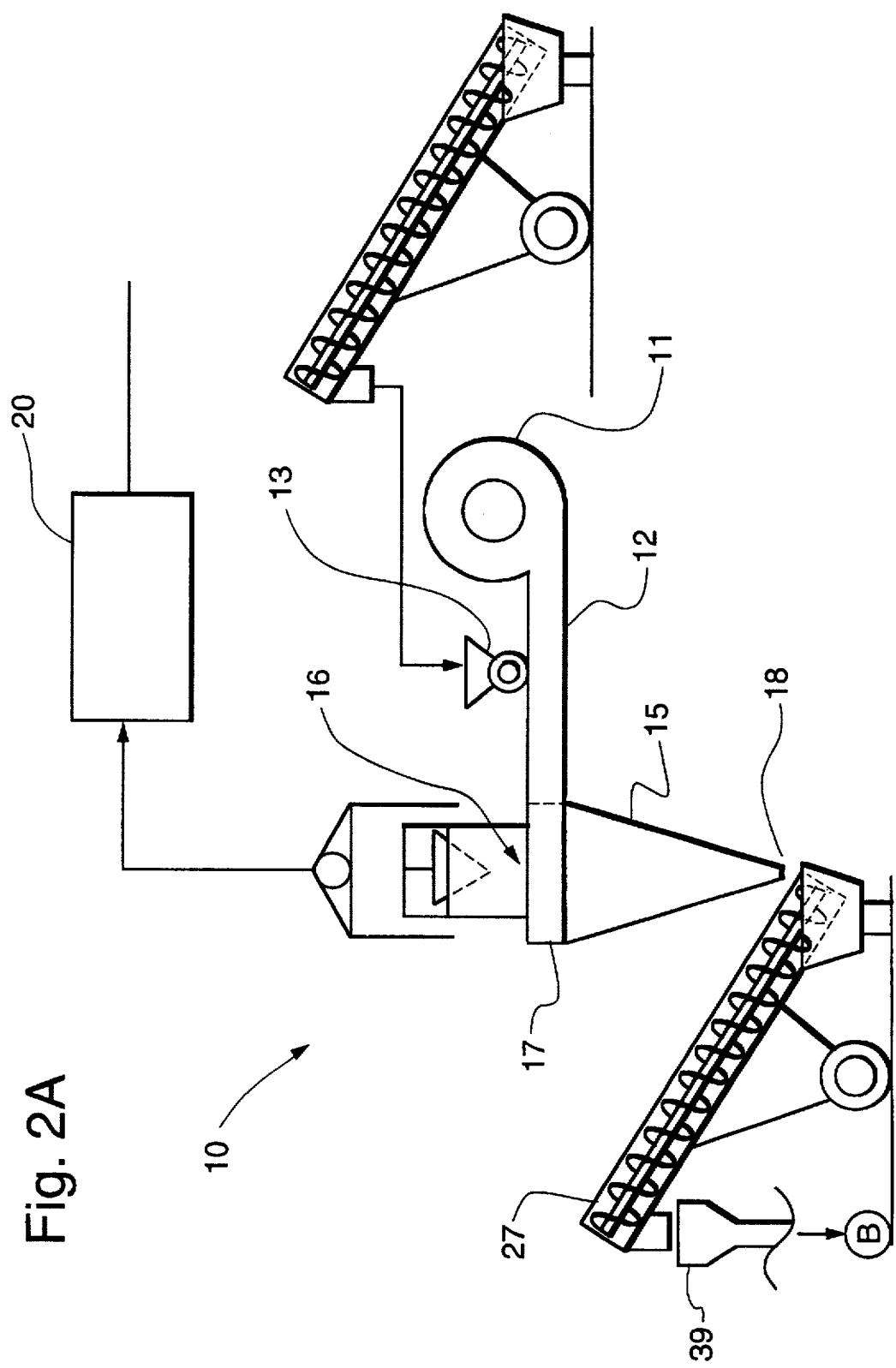

Referring now to FIGS. 2A and 2B, the apparatus for reclaiming precious metals, such as gold and platinum, can best be seen. As described above with respect to FIG. 1, the cyclonic comminuting/dehydrating machine 10 serves as the apparatus for initiating the recovery process. Low grade, precious metal-bearing ore is found as waste material of mining operations. The percentage of content of the precious metals within the waste material is so small as to be cost prohibitive to process the material to obtain the small amount of precious metals from the ore. The typical waste material will have large amounts of inert stones and quartz within which will be mixed iron ore containing the small amounts of precious metals, such as gold, platinum and cobalt.

The low grade ore/waste material is fed into the conduit 12 to be carried with the air stream from the blower 11 into the housing 15 of the cyclonic comminuting/dehydrating machine 10. The operation of the comminuting machine 10 will reduce the waste material into a dry, fine powder that is discharged out of the material discharge opening 18 at the bottom of the truncated, inverted conical housing 15. The air stream discharged through the exit opening 16 will carry dust particles that can be precipitated out of the discharged air as described above before being discharged to the atmosphere or utilized later in the process to assist in the drying of the residue, as will be described in greater detail below.

Unlike the recovery process described above to recover precious stones, no screening mechanism needs to be utilized as the precious metals are locked within an iron ore compound and are homogeneously mixed within the powdered material discharged from the housing 15. The powdered waste material is received from the material discharge opening 18 and conveyed, such as by an auger 27 or conveyor belt, to a wash tank apparatus 30 for the recovery of the precious metal laden iron ore from the waste material.

Figure 4:
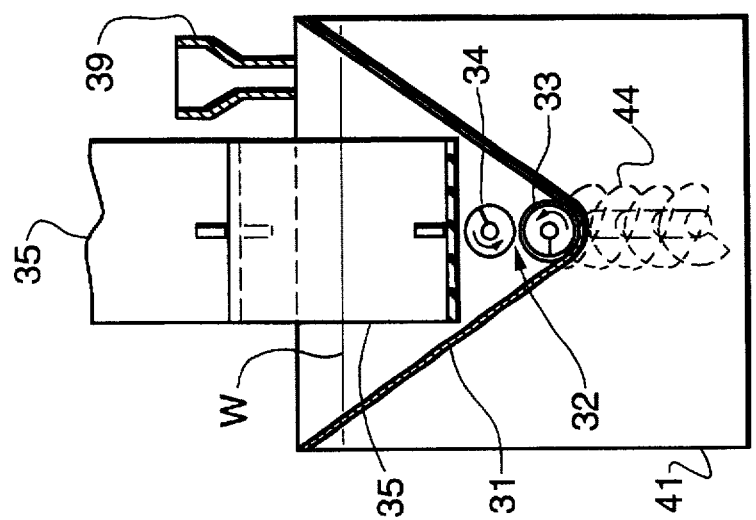
FIG. 4 is a schematic cross-sectional view of the wash tank taken along lines 4—4 of FIG. 3.
Figure 3:
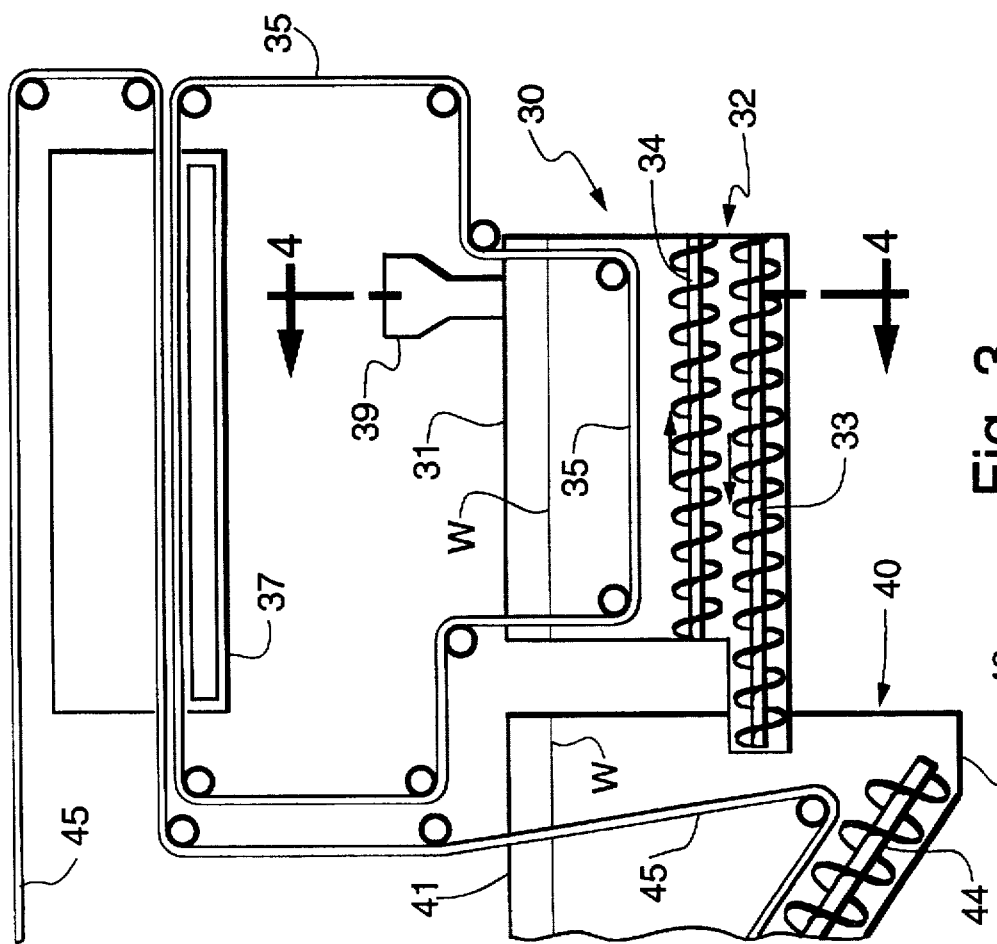
FIG. 3 is an enlarged schematic side elevational view of the wash tank for reclaiming precious metals forming part of the apparatus depicted in FIGS. 2A and 2B.

As best seen in FIGS. 3 and 4, the wash tank apparatus 30 is preferably configured as a V-shaped tank body 31 substantially filled with water W and having a double auger mechanism 32 located at the bottom of the tank 31 where the sides of the tank converge to the narrowest part of the tank 31. The purpose of the preferred double auger mechanism 32 is to agitate the material within the tank 31. Other mechanisms, including a long single auger, can be provided to accomplish this function; however, the double auger mechanism 32 is preferred because of its compact configuration.

The auger mechanism 32 includes a lower auger 33 rotatably mounted at the bottom of the tank 31 to convey material in a first direction and an upper auger 34 rotatably mounted within the tank 31 immediately above the lower auger for rotation in the opposite direction from the lower auger 33. The counter-rotating augers 33, 34 operate to agitate the material being dumped into the tank body 31 through the intake hopper 39 and to create a thorough mixture thereof with the water W within the tank body 31. The agitation of the material is enhanced by the upper auger 34 conveying the material into the side wall of the tank 31.

An electromagnetic extractor 35, preferably constructed from a conveyor chain having electromagnets mounted thereto, is passed over the upper auger 34 to extract the iron ore fractional component of the pulverized waste material and also to extract any cobalt fractional component from the solution within the tank body 31 by magnetic attraction. The iron ore which carries gold, platinum and cobalt is magnetically attractive due to being a ferrous material and further due to being combined with cobalt. Preferably, the electromagnetic extractor 35 is energized while passing along a run extending parallel to the upper auger 34 to attract the iron ore/gold/cobalt/platinum compound out of the solution agitated by the double auger mechanism 32. The electromagnetic extractor 35 carries the compound over a deposit pan 37 so that the material extracted from the wash tank 30 can be removed from the electromagnetic extractor 35, such as by de-energizing the electromagnets on the conveyor chain while over the deposit pan 37.

The material on the deposit pan 37 will have a relatively high concentration of precious metals, as compared to the low grade ore from which the material was extracted; however, further processing will be necessary to separate each of the precious metals from the extracted material. Since the concentration of precious metals is now significantly higher, and since the volume of material to be treated is substantially less, further processing of the extracted material can be economically done by chemical treatment, such as with aqua regia. Preferably, however, the further processing of the extracted fractional component would be accomplished by smelting. Smelting would be less harmful to the environment than chemical treatment and would also be less costly to operate.

Other trace precious metals are typically found in this waste material in combination with the gold, platinum and cobalt, such as iridium, osmium, palladium, ruthenium and rhodium. By conveying the extracted material off the deposit pan 37 to a smelting operation (not shown), each of these materials can be drawn from the extracted compound in a melted state. The melting points of each of these materials is as follows:

| Gold | 1064.43 C. |
|---|---|
| Iron | 1535 C. |
| Iridium | 2410 C. |
| Osmium | 2700 C. |
| Palladium | 1554 C. |
| Platinum | 1772 C. |
| Ruthenium | 2310 C. |
| Rhodium | 1966 C. |

Only iron and palladium have melting points that are close to each other, which may cause inefficiencies in the smelting process to remove palladium from the extracted material. If sufficient quantities of palladium exist to justify the expenditure, chemical treatments can be used on the smelted material to obtain the palladium.

Returning to the wash tank 30, the lower auger 33 conveys the residue, including the inert rock, quartz, etc. remaining after the extracted material has been removed from the wash tank 30 by the electromagnetic extractor 35, from the bottom of the tank body 31 to a drying mechanism 50. The excess water is drained off the residue material and recycled back into the wash tank to minimize the water requirements for the process. The residue material is then passed to the drying apparatus 50 where the residue can be dried naturally or synthetically and then returned to the ground. The discharged air from the comminuting machine 10 can be cycled through the drying apparatus 50 and used to effect a drying of the residue, such as by heating the air and blowing the heated air through the drying apparatus 50. In the event heated air is used in the drying apparatus 50, this apparatus 50 would preferably be in the form of a progressive tumble dryer.

A secondary wash tank 40 can be positioned between the primary wash tank 30 and the drying apparatus 50 to provide a second pass at extracting material from the residue before it is dried. The secondary wash tank 40 includes a generally rectangular tank body 41 which is in flow communication with the primary wash tank 30 such that the lower auger 33 conveys the residue material directly into the water filled tank body 41. Preferably, the residue can be directed into a sump 43 by appropriately sloped tank floor from which an auger 44 conveys the material out of the secondary wash tank 40 to the drying apparatus 50. Since the primary and secondary wash tanks 30, 40 are in open flow communication, the water W in the primary wash tank 30 is shared with the secondary wash tank 40 and the water level W in the two tank bodies 31, 41 is at substantially the same elevation.

A secondary electromagnetic extractor 45 of similar construction to the primary electromagnetic extractor 35 can be positioned generally parallel to the rotational axis of the auger 44 immediately above the auger 44. The operation of the auger 44 within the secondary, water-filled, wash tank 40 will cause additional agitation of the residue material and allow the secondary electromagnetic extractor 45 to retrieve any remaining magnetic fractional components, as was initially accomplished within the primary wash tank 30. Subsequent deposit of the extracted material from the secondary wash tank 40 onto the deposit pan 37 will allow this extracted material to be combined with the previously extracted material for further processing.

While the preferred method of extracting the magnetic fractional component from the comminuted material utilizes a water-filled wash tank to hydrate the material and facilitate the agitation thereof for exposure to the electromagnetic extractor 35, an alternative configuration (not shown) would provide a spreading apparatus to create a thin layer of dry pulverized material on a conveyor belt. The electromagnetic extractor 35 would then be passed over the thin layer of dry material to attract and extract the fractional component bearing the precious metals.

A further alternative would be to use the electromagnetic extractor as the conveying belt on which the thin layer of pulverized material is deposited. The inert material could be discharged off the end of the electromagnetic belt, while the attracted fractional component bearing the precious metals remained attached to the belt until passing over the deposit pan 37 where the extracted fractional component would then be removed for further processing. As with the preferred embodiment described above, a secondary extraction process may be desired to provide additional opportunity to extract the magnetic fractional component of the discharged residue. The final discharged residue would not require treating to remove water and could be directly returned to the ground from which the material was first obtained.

Figure 5:
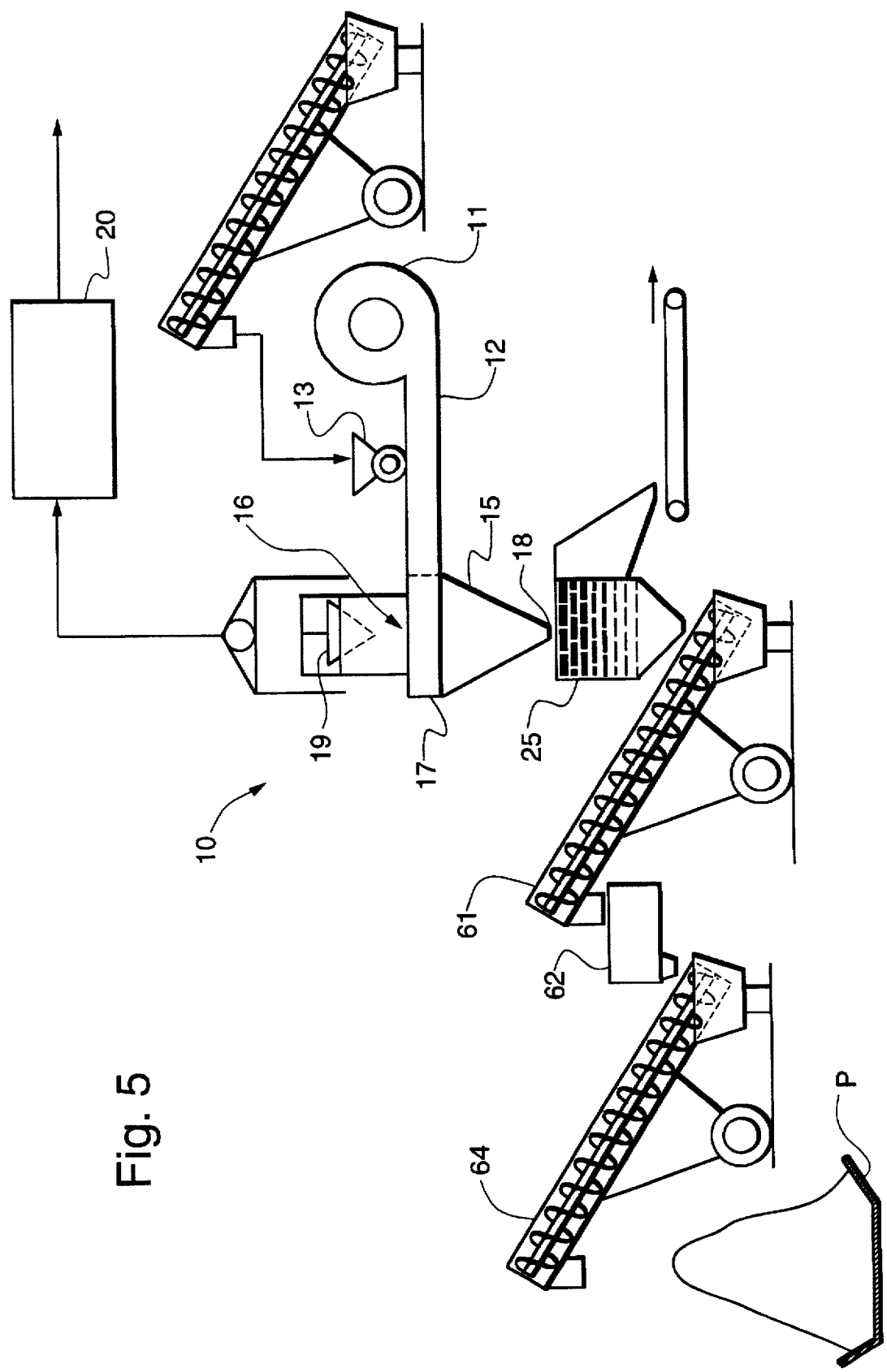
FIG. 5 is a schematic view of the apparatus for reclaiming lead from contaminated soils.

Referring now to FIG. 5, the apparatus for removing lead from contaminated soil can best be seen. Lead contaminated soil can be found at lead mines in the waste material associated with mining operations. Lead contaminated soil can also be found at shooting ranges or at rod and gun clubs where expended shot falls to the ground. One problem with lead contaminated soils now drawing attention from environmental protection agencies is the oxidization of lead, which is then leached into and through the soil to the ground water. Any process for removing lead from contaminated soils would need to recover or stabilize both the free lead particles and the oxidized lead within the soil.

Such a process can be accomplished by the apparatus shown in FIG. 5. One skilled in the art will readily recognize that steel shot will be removed from the soil equally well with the lead pellets. As with the other processes described above, the process begins with the cyclonic comminuting/dehydrating machine 10. The lead contaminated soil is fed through the infeed hopper 13 into the high velocity stream of air passing through the conduit 12 to be comminuted before being discharged through the material discharge opening 16. As with the process for recovering precious stones, the comminuted material is first passed through a screening mechanism 25 to screen off all material not passing through a 200 mesh screen.

Generally, most of the material being screened off in the mechanism 25 comprises lead pellets. Since the lead pellets, e.g. bullets and shot, etc., are in relatively small volume and have greater density than the soil particles being reclaimed, the soil particles become comminuted to a fine powder that will generally pass through a 200 mesh sieve, while the lead pellets will come through the comminuting machine relatively unharmed. It should be noted, however, that, depending on the consistency of the soil being reclaimed from lead contamination, other inert soil particle, such as stones, may come through the machine 10 unharmed and be screened off with the lead particles.

As noted above, the fractional component screened off in the screening mechanism 25 will be lead pellets, which can be recycled and sold. The residue material passing through the 200 mesh screen will, however, still have oxidized lead remaining as a component thereof. The further processing of the residue material will stabilize the oxidized lead and prevent further oxidation and leaching thereof.

After passing through the screening mechanism 25, the residue material would be collected into a hopper from which an auger 61 elevates the residue material to the next processing step. While in the first auger 61, an ion exchange chemical, such as HAZ-FRZ produced by GSG Associates Inc. of Atlanta, Ga., is preferably added dry to the dry powdery residue material being conveyed by the auger 61 to enhance the mixing of the ion exchange chemical with the powdery residue. The two materials would be mixed thoroughly before being discharged from the auger 61 into the hopper of a second auger 64, although a surge box 62 may be utilized to keep the hopper of the second auger from becoming overfilled from the first auger 61.

In the second auger 64, enough water is added to the dry material to create a heavy paste, preferably having the consistency of toothpaste. The addition of the water to the dry mixture activates the ion exchange chemical causing each lead particle to be encapsulated in the chemical which prevents any further oxidation and leaching of the lead particles. The paste mixture can then be discharged directly onto a plastic liner P on the ground in conical piles where the paste mixture will be permitted to completely undergo the ion exchange process. Approximately two hours has been found to be adequate to complete the ion exchange process, after which the paste mixture is tested with the 1000 Year Leach Test.

Satisfactory results from the 1000 Year Leach Test will enable the paste mixture to be returned directly to the ground with the blessings of the Environmental Protection Agency. The paste mixture will eventually dehydrate naturally, or the mixture could be dried artificially before being re-deposited on the ground. While undergoing the ion exchange process, the area on which the plastic sheet P supporting the conical pile of paste mixture will necessarily require run-off control so that any water separating from the paste mixture will not be returned to the ground before passing the 1000 Year Leach Test.

Should the ion exchange process not satisfactorily encapsulate the lead particles, such that the 1000 Year Leach Test is failed, the paste material will then be re-circulated through the ion exchange process, in which additional ion exchange chemical will be added to the paste mixture and additional water added to activate the ion exchange chemical before being re-discharged onto a plastic sheet P for completion of the ion exchange process. The process will be repeated until the 1000 Year Leach Test can be passed and the material returned to the ground.

Alternatively, the ion exchange chemical could be combined with the water added to the dry powdery residue in a single auger 64 after passing through the screening mechanism 25. In this alternative configuration, the first auger 61 for dry mixing the ion exchange chemical and the comminuted residue would be eliminated. A possible complication with this alternative process is acquiring an adequate mixing of the ion exchange chemical with the powdery residue to be effective to encapsulate the lead particles. Clearly, only one pass through the mixing auger 64 is desired to pass the 1000 Year Leach Test. Re-circulating the paste mixture for a second application of the ion exchange chemical would not be desirable, but would have to be accomplished if the first application were not successful.

In actual practice, a batch of lead contaminated soil would be processed in one day and not tested until the following day, when the results of the 1000 Year Leach Test would dictate whether the processed material would be returned to the ground or re-processed. A continuous process involving a day's worth of processing and subsequent testing and removal the following day would be preferable.

Figure 6A:
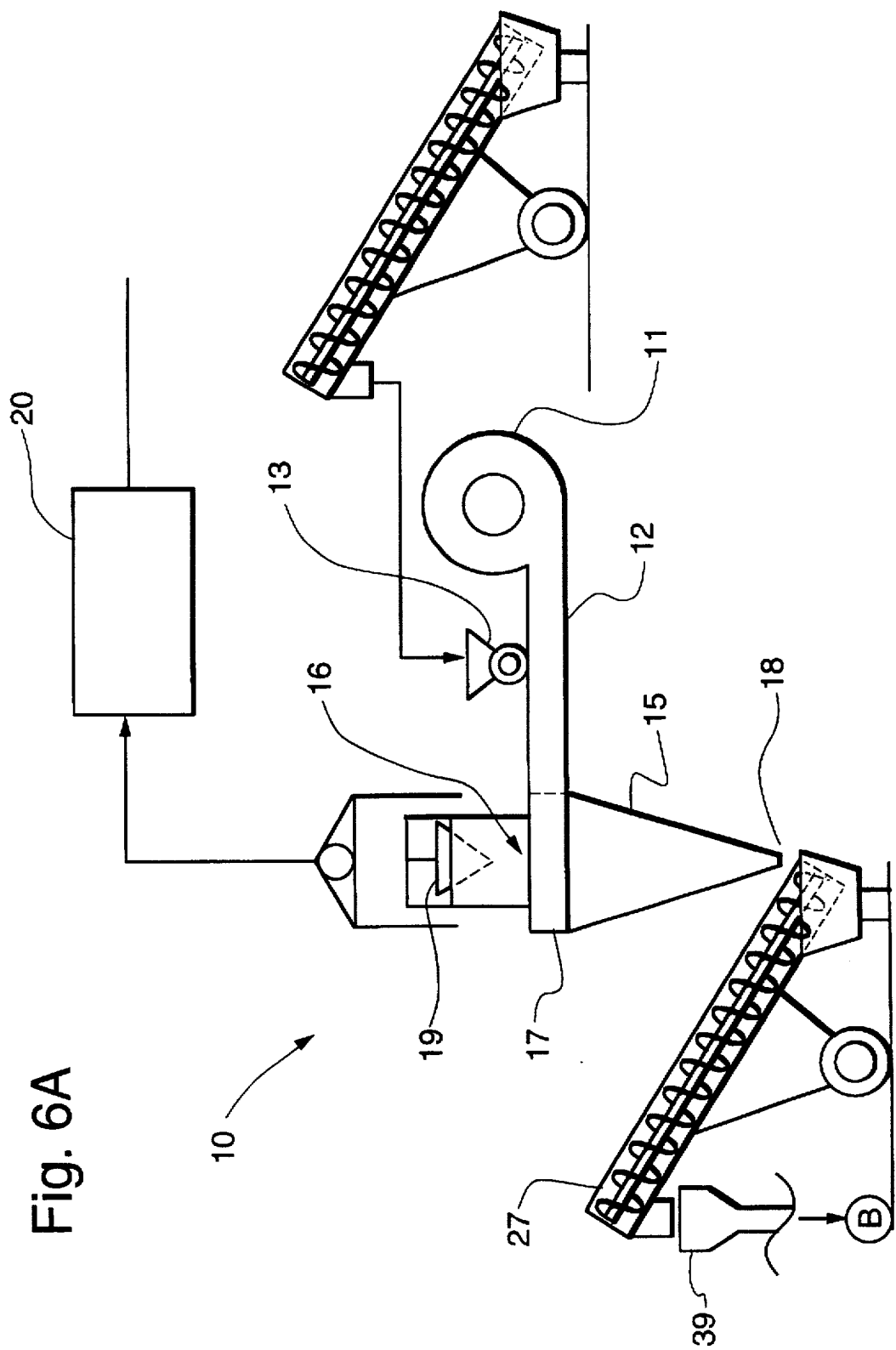
FIG. 6A and FIG. 6B are to be combined to depict a schematic view of the apparatus for removing free sulphur from coal.
Figure 6B:
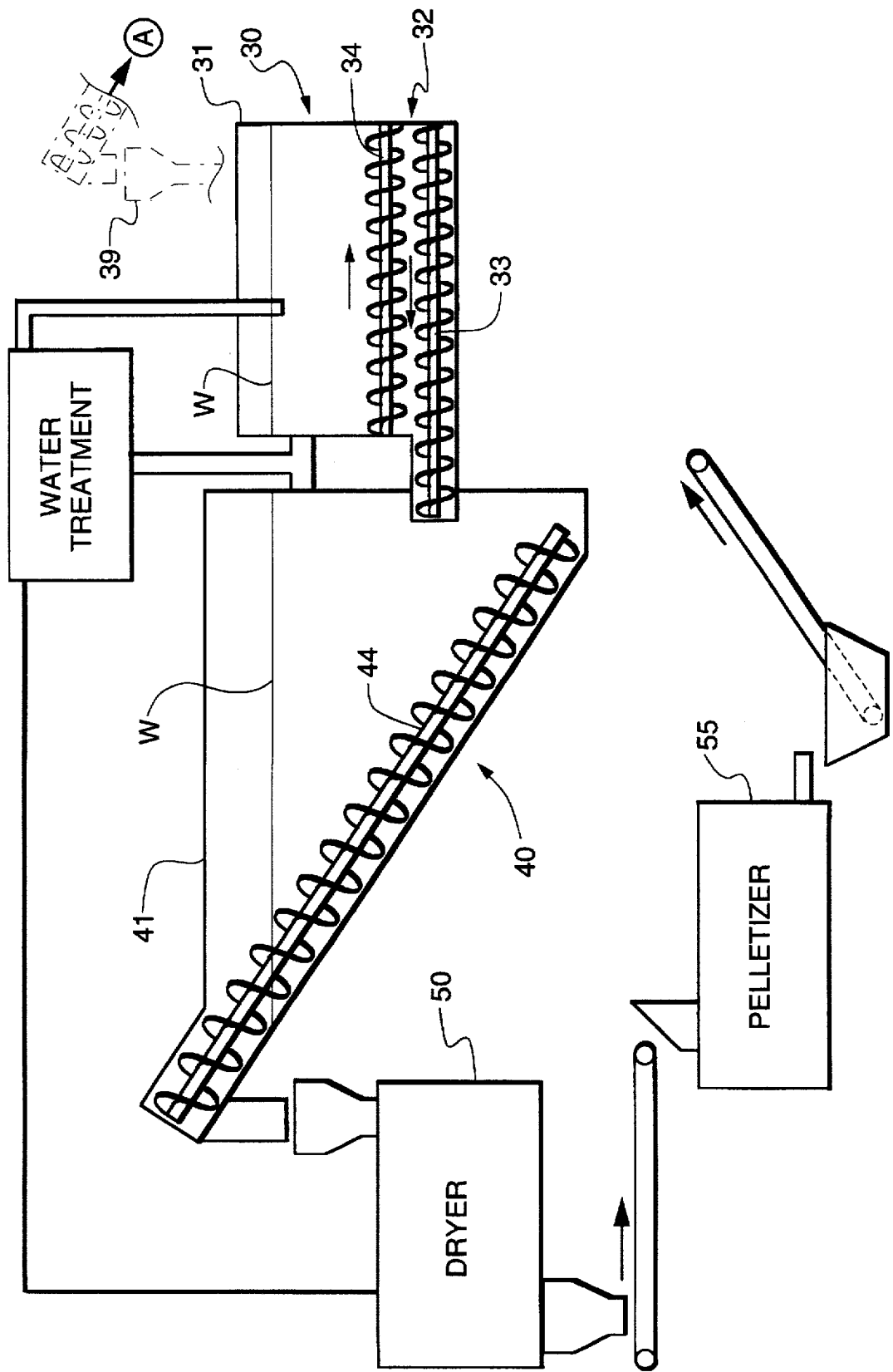

The process for removal of free sulphur from coal is reflected in the apparatus depicted in FIGS. 6A and 6B. The process is similar to the soil washing process for removing hydrocarbons from contaminated soil as described in the aforementioned pending patent application entitled "Soil Washing Apparatus and Method". The process is initiated with the pulverizing of the coal with the cyclonic comminuting/dehydrating machine 10. The coal is fed into the high velocity stream of air passing through the conduit 12 to enter the housing 15 where the coal, like the limestone rocks described in the examples first given above, is pulverized into a fine powder discharged by gravity through the material discharge opening 18 at the bottom of the truncated inverted conical housing 15.

Coal is associated with two forms of sulphur, an organic sulphur which is incorporated into the molecular hydrocarbon chain forming coal and a free sulphur. Organic sulphur typically constitutes approximately 3% of the coal material by volume and cannot be removed from the material; however, free sulphur, which comprises approximately 4% of the coal material by volume, can be removed as a fractional component thereof.

After receiving the pulverized coal from the comminuting machine 10, a conveyor 27 in the form of either a conveyor belt or an auger will transport the pulverized coal into the primary wash tank 30. The double auger mechanism 32 will thoroughly mix the pulverized coal with the water W in the tank body 31 whereby the free sulphur will dissolve in the water W. As noted above with respect to FIGS. 2B, 3 and 4, the double auger mechanism 32 is the preferred configuration; however, other apparatus that is effective to agitate the pulverized coal to effect the dissolving of the free sulphur can equally be provided.

After the counter-rotating augers 33, 34 have agitated the pulverized coal to remove the free sulphur, the lower auger 33 will convey the washed coal residue into a secondary wash tank 40 where an auger mechanism 44 will further agitate the coal residue within the water bath to be assured that all of the free sulphur has been exposed to the water W to be dissolved therein. The necessity of the secondary wash tank 40 will depend on the amount of free sulphur within the coal to be removed and the efficiency of the double auger mechanism 32 to effect a dissolving of the free sulphur in the water bath.

The washed coal residue can be discharged from the auger 44 in the secondary wash tank 40 into a dryer apparatus 50 in which the water will be removed from the pulverized coal material through either a natural or an artificially induced drying process. One skilled in the art will readily realize that the pulverized coal will then have to be pelletized in order to be burned. Accordingly, a pelletizer 55 will preferably be added to the process after the drying apparatus 50 has reduced the pulverized coal to the proper moisture content for optimum pelletizing. The pelletized coal can then be transported to the location at which the de-sulphured coal can then be burned.

The water W in the primary and secondary wash tanks 30, 40 will have to be re-cycled through a chemical precipitator to remove the sulphur therefrom. The precipitated sulphur can be a salable by-product of the process. The cleansed water can then be re-cycled through the wash tanks 30, 40. Obviously, the water remaining in the washed coal residue and removed in the drying stage of the process will have to be captured and cleansed in the same manner as the water remaining in the wash tanks 30, 40.

In each process described above, the corresponding apparatus is preferably constructed so as to be portable. In this manner, the apparatus can be transported to the job site to process soil, as opposed to having the soil to be treated transported to the apparatus for treating the soil. Taking the apparatus to the job site would allow for the residue discharged from the apparatus to be returned to the ground directly from where the soil was first obtained.

It is anticipated that other heavy metals, such as mercury and iron, can be retrieved from either low grade waste materials or from contaminated soils through processes that are similar to those described above and are intended to be incorporated within the teachings of the disclosed inventions. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having this described the invention, what is claimed is:

1. A method for recovering precious metals associated with iron ore and cobalt and forming a fractional component of low grade ore-bearing soil obtained from a source, comprising the steps of:

pulverizing the ore-bearing soil in a cyclonic comminuting/dehydrating mechanism to create a dehydrated pulverized soil material having fractional components, including a first fractional component containing iron ore and cobalt which has been released from the associated soil material binding said first fractional component into said ore-bearing soil;

passing the pulverized soil material beneath a magnetic device to extract said first fractional component therefrom onto said magnetic device and leaving an inert residue as a second fractional component;

transporting the extracted first fractional component from the magnetic device to a remote location;

processing said extracted first fractional component to recover precious metals therefrom; and disposing of the inert residue.

2. The method of claim 1 wherein said processing step includes the step of:

smelting the extracted first fractional component.

3. The method of claim 2 further including the step of:

after said pulverizing step, mixing said pulverized soil material with water in a primary wash tank prior to said passing step.

4. The method of claim 3 wherein said passing step utilizes an electromagnet to extract the first fractional component, said mixing step including the step of agitating the pulverized soil material within said wash tank with an auger mechanism, said electromagnet being passed over said auger mechanism.

5. A method for recovering precious metals associated with iron ore and cobalt and forming a fractional component of low grade ore-bearing soil obtained from a source, comprising the steps of:

pulverizing the ore-bearing soil to create a pulverized soil material;

mixing said pulverized soil material with water in a primary wash tank by agitating the pulverized soil material within said primary wash tank with an auger mechanism;

passing an electromagnetic device over said agitated pulverized soil in said auger mechanism to extract a fractional component therefrom containing iron ore and cobalt onto said electromagnetic device and leaving an inert residue within said auger mechanism;

transporting the extracted fractional component from the magnetic device to a remote location;

processing said extracted fractional component to recover precious metals therefrom; and disposing of the inert residue from said auger mechanism.

6. The method of claim 5 wherein said mixing and passing steps include:

agitating said pulverized soil material in a first auger mechanism where a first electromagnetic device is passed over said agitated pulverized soil material to extract a first fractional component containing iron ore and cobalt and leaving a remnant material within said first auger mechanism; and discharging said remnant material into a second auger mechanism to further agitate the remnant material so that a second electromagnetic device passing over said second auger mechanism can extract a second fractional component containing iron ore and cobalt and leave said inert residue.

7. A method for recovering pellets of dense material from less dense earthen material bearing said pellets, comprising the steps of:

pulverizing the earthen material in a cyclonic comminuting/dehydrating machine to create a dehydrated discharged material containing a pulverized soil component created from said less dense earthen material by the comminution thereof without disintegrating said pellets of dense material;

passing said discharged material through a sieve having a size to permit the passage of said pulverized soil component therethrough without allowing the passage of said pellets of dense material;

collecting said pellets of dense material from said sieve; and disposing of the pulverized soil component.

8. The method of claim 7 wherein said pellets of dense material are precious carbon jewels, said earthen material being a soil conducive to the growth of precious carbon jewels.

9. The method of claim 8 wherein said collecting step includes the step of separating said precious carbon jewels from incompletely pulverized earthen material that cannot pass through said sieve.

10. The method of claim 7 wherein said pellets of dense material are lead pellets borne in contaminated soil.

11. The method of claim 10 wherein said collecting step includes the step of separating said lead pellets from incompletely pulverized earthen material that cannot pass through said sieve.

12. The method of claim 11 wherein said disposing step includes the steps of:

combining said pulverized soil component and said incompletely pulverized earthen material remaining after the separation of said lead pellets therefrom to create residue material;

further processing of the residue material to stabilize any oxidized lead within said residue material to prevent further oxidation thereof; and returning the residue material to the ground.

13. The method of claim 12 wherein said further processing step includes the steps of:

mixing said residue material with an ion exchange chemical to create a mixed material;

adding water to said mixed material to create a paste and to activate the ion exchange chemical; and storing said paste until an ion exchange process has been completed.

14. The method of claim 12 wherein said further processing step includes the steps of:

mixing an ion exchange chemical with water to create an ion exchange mixture;

adding said ion exchange mixture to said residue material to create a paste and to initiate an ion exchange process; and storing said paste until said ion exchange process has been completed.

15. The method of claim 14 said further processing step further includes the step of:

testing said paste at the termination of said storing step to determine if said paste will pass a 1000 Year Leach Test; and in the event said paste fails said 1000 Year Leach Test, re-mixing said paste with additional quantities of said ion exchange chemical and water, followed by re-storing the re-mixed paste until the ion exchange process has been completed.

16. A method of removing free sulphur from coal, comprising the steps of:

disintegrating the coal in a cyclonic comminuting/dehydrating machine to create a discharged material including a pulverized coal component and a free sulphur component;

agitating the discharged material in a water bath to dissolve the free sulphur component and create residue coal from the remaining pulverized coal component;

processing the water solution to remove the dissolved free sulphur component therefrom; and drying the residue coal.

17. The method of claim 16 wherein said processing step includes the step of chemically precipitating the dissolved free sulphur component.

18. The method of claim 17 wherein said agitating step includes the steps of:

engaging the discharged material by a primary agitating mechanism in a primary wash tank to create a remnant material containing said pulverized coal component and a remaining free sulphur component;

transporting said remnant material from said primary wash tank to a secondary wash tank having a supply of water therein; and re-agitating said remnant material by a secondary agitating mechanism to dissolve said remaining free sulphur component from said remnant material, said processing step treating the water solution from both said primary and secondary wash tanks.

19. The method of claim 18 wherein said engaging step includes the step of utilizing a pair of counter-rotating augers as the primary agitating mechanism, said re-agitating step including the step of utilizing an auger mechanism as the secondary agitating mechanism.

20. The method of claim 19 further comprising the step of pelletizing the residue coal after said drying step has reduced the moisture content of said residue coal to an optimum level for said pelletizing step.

* * * * *